US007896246B2

(12) United States Patent
Critelli

(10) Patent No.: US 7,896,246 B2
(45) Date of Patent: Mar. 1, 2011

(54) METHOD AND SYSTEM FOR DETECTING POTENTIAL COERCION OR VOTE BUYING IN VOTE BY MAIL SYSTEMS

(75) Inventor: Michael J. Critelli, Darien, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 12/168,323

(22) Filed: Jul. 7, 2008

(65) Prior Publication Data

US 2010/0001070 A1 Jan. 7, 2010

(51) Int. Cl.
*G06K 17/00* (2006.01)

(52) U.S. Cl. ...................................................... 235/386

(58) Field of Classification Search ................. 235/386, 235/50 A, 54 F, 56; 705/14.26, 14.47; 707/3, 707/7, 9

See application file for complete search history.

(56) References Cited

U.S. PATENT DOCUMENTS

2002/0091673 A1* 7/2002 Seibel et al. ................... 707/1

2004/0128190 A1* 7/2004 Campo et al. ................. 705/12

OTHER PUBLICATIONS

Greg Borowski; "Police, FBI join investigation into possible election fraud"; Jan. 26, 2005; Milwaukee Journal Sentinel (3 pages).*

Laurence Hammack; "Vote fraud case hangs on red ink, ballots"; Oct. 5, 2006; Roanoke Times (3 pages).*

* cited by examiner

*Primary Examiner*—Thien M Le

(74) *Attorney, Agent, or Firm*—Brian A. Lemm; Charles R Malandra, Jr.

(57) ABSTRACT

Organized coercion or buying of votes can be detected based upon information associated with the return of vote by mail ballots, and more specifically an induction parameter related to the location where and time at which vote by mail ballots are inducted into a carrier system for return to the election officials. Upon receipt of the vote by mail ballots by election officials, at least one induction parameter is obtained from the envelope. The data that is collected can be analyzed to detect situations that indicate potential coercion or vote buying by comparing it with expected induction parameters. If a situation that indicates potential coercion or vote buying is detected, those voters whose ballots are involved can be contacted by the election officials, before the votes are tallied, to ensure that the specific voters have not been coerced or sold their vote.

12 Claims, 5 Drawing Sheets

METHOD AND SYSTEM FOR DETECTING POTENTIAL COERCION OR VOTE BUYING IN VOTE BY MAIL SYSTEMS

FIELD OF THE INVENTION

The present invention relates to voting systems, and in particular to a vote by mail system that can detect potential coercion or buying of votes.

BACKGROUND OF THE INVENTION

In democratic countries, governmental officials are chosen by the citizens in an election. Conducting an election and voting for candidates for public office can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he or she must go to the polling place at which he or she is registered, based on the voter's residence. Another method for conducting an election and voting utilizes paper ballots that are mailed to the voter who marks the ballot and returns the ballot to the voting authority running the election through the mail. In the usual vote by mail process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent his/her human or machine readable identification.

When the return envelope is received at the registrar's office of the voting authority, a voting official compares the voter signature on the envelope with the voter signature retrieved from the registration file to make a determination as to whether or not the identification information and signature are authentic and valid, and therefore the vote included in the envelope should be counted. If the identification information and signature are deemed to be authentic and valid, the identifying information and signature are separated from the sealed ballot before it is handed to the ballot counters for tabulation. In this manner, the privacy of the voter's selections is maintained and thus the ballot remains a "secret ballot."

Vote by mail systems offer many advantages for both voters and election officials in terms of convenience, lower cost, higher voter participation, and potentially greater security and reliability. However, an objection raised to voting by mail is that it can result in organized groups, such as, for example, political parties, labor unions, corporations, churches, advocacy groups or the like, coercing voters to vote in a particular manner or paying voters to vote in a particular manner, also referred to as buying votes (or, from the voters' perspective, selling votes). In either such situations, a voter would merely need to sign the return envelope and give it to some third party with the blank ballot. The third party would then complete the ballot and mail it in the signed envelope provided by the coerced or selling voter. Because the envelope includes a genuine signature, the ballot will be authenticated as a valid vote by the voting registrar.

One possible solution to protect legitimate voters from coercion and for discouraging vote selling is to allow for voters to contact election officials separately and confidentially and rescind their votes prior to tabulation. With respect to coercion, potential coercers would recognize that their coercion may not be effective, since the voter could rescind a vote before that vote was actually tabulated. With respect to vote buying, buyers would be reluctant to buy votes since a voter could potentially sell a vote that is never tabulated. This solution, however, will work only if there is sufficient time delay between the receipt of the ballots and tabulation for a voter to contact election officials. In addition, if voters are not aware that such a right to rescind is available, it will not be utilized.

Another possible method for protecting legitimate voters from coercion and discouraging vote selling is to allow for a voter to return multiple ballots by mail, with only one actually being counted. With respect to coercion, potential coercers would recognize that their coercion may not be effective, since the voter could still vote for himself or herself in such a way that only that vote would be counted. With respect to vote buying, buyers would be reluctant to buy votes since a voter could potentially inconspicuously sell as many votes to as many buyers as he or she wanted, and still vote for himself or herself in such a way that only that vote would be counted. While allowing multiple ballots may seem like a good solution to the vote buying and voter coercion problems, current legislation in many jurisdictions specify that when multiple ballots are received, the ballot to be counted is either the first one received or the last one received (depending on the jurisdiction). This gives some control to a fraudster (a buyer or coercer) to increase the chances that his or her ballot, and not another one from the legitimate voter, will be counted. For example, if the ballot to be counted is the first one to be received, the fraudster would act as early as possible, and if the ballot to be counted is the last one to be received, the fraudster would act as late as possible.

Voting by mail is becoming more prevalent (apart from the usual absentee voting), and in some jurisdictions, entire elections are being conducted exclusively by mail. Thus, it would be beneficial for election officials to be able to detect potential voter coercion or vote buying by organized groups.

SUMMARY OF THE INVENTION

The present invention alleviates the problems associated with the prior art and provides methods and systems that will allow election officials to detect potential voter coercion or vote buying by organized groups.

In accordance with the present invention, organized coercion or buying of votes can be detected based upon information associated with the return of vote by mail ballots, and more specifically one or more induction parameters related to induction of the vote by mail ballots into a carrier delivery system for return to the election officials. Such induction parameters can include, for example, the location where and time when vote by mail ballots are inducted into the carrier delivery system for return to the election officials. Most, if not all, voters are highly likely to deposit their mail for induction into the postal system at a location close to their residence. In addition, voters will typically act independently of other voters, and therefore each voter will compete and return the vote by mail ballot at a different time. As mail pieces are inducted into the postal system, the mail pieces are marked to indicate the induction location and time of induction. Such marking could be provided, for example, in the form of a machine readable barcode provided on the outside of each envelope. Upon receipt of the vote by mail ballots by election officials, the marking indicating the induction location and time of induction are obtained from the envelope containing the ballot. This information is associated with the specific voter whose signature appears on the envelope containing the ballot and the specific voter's residence, which can be obtained using the voting records maintained for each voter or the voter information provided on the envelope, or alternatively, a location as specified by the voter. The data that is collected by the election officials can be analyzed, using for example, one or more business rules, to detect situations that indicate potential coercion or vote buying. Such situations can include, for example, a number of vote by mail ballots having the same induction location that varies from the expected induction locations (e.g., close to the voters' residences or locations specified by the voters), a large number of vote by mail ballots that are inducted at the same time, or even just a single vote by mail ballot that has an induction location that varies from the expected induction location. In the event that a situation indicating potential coercion or vote buying is detected, those voters whose ballots are involved can be contacted by the election officials, before the votes are tallied, to ensure that the specific voters have not been coerced or sold their vote.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
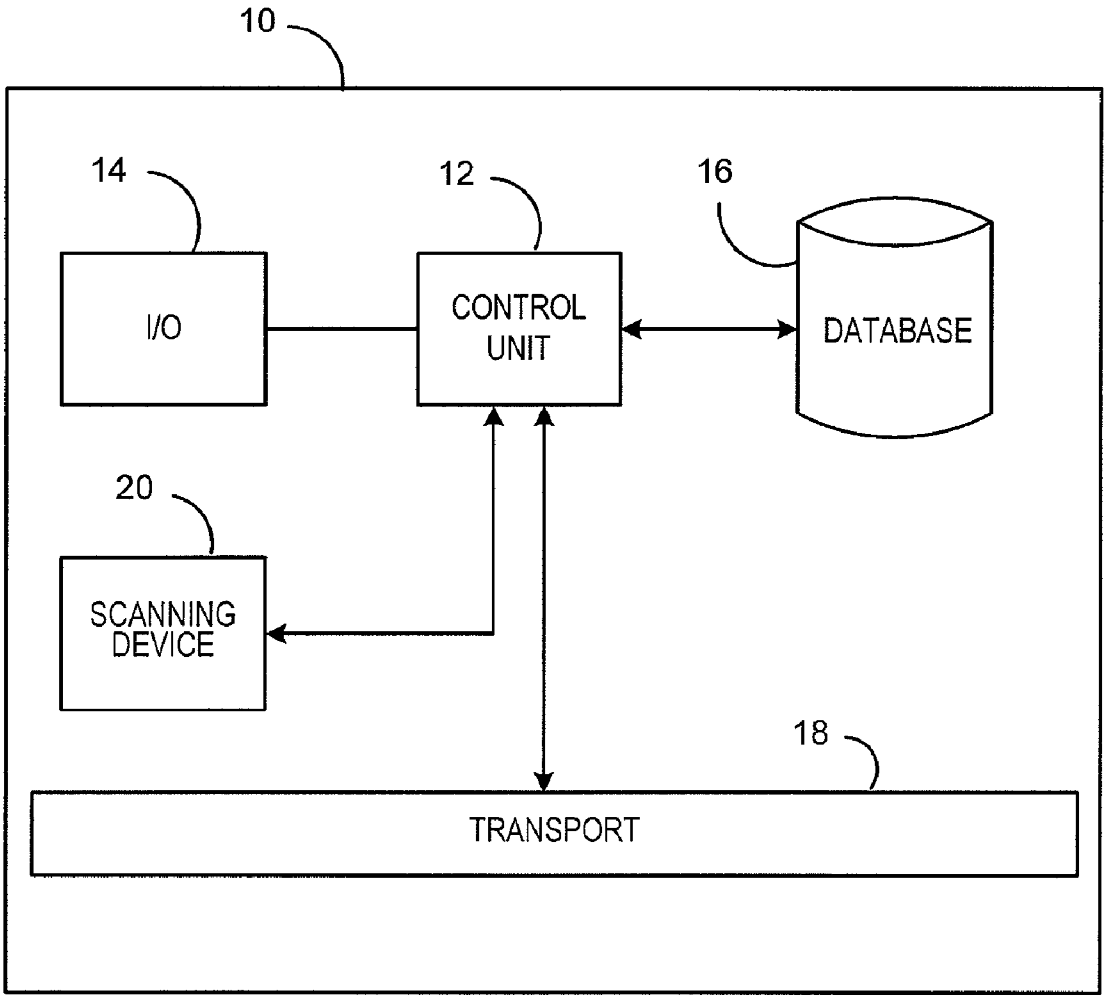
FIG. 1 illustrates in block diagram for a system that may be used in one particular embodiment of the vote by mail system of the present invention.

In describing the present invention, reference is made to the drawings, wherein there is seen in FIG. 1 a system 10 that may be used by election officials to detect possible coercion or vote buying according to one particular embodiment of the present invention. System 10 includes a control unit 12, such as, for example, a general or special purpose microprocessor or the like, personal computer, or the like. An input/output unit (I/O) 14, such as, for example, keyboard, display unit, and the like, is connected to the control unit 12 to allow information to be provided to and from the control unit by an operator or user of the system 10. Control unit 12 is connected to a database 16, which is used to store voter information, including, for example, each voter's name, address, and a reference signature for use in verifying ballots received by mail. Database 16 is also used for storing information obtained during the processing of vote by mail ballot envelopes as further described below. A transport 18, such as, for example, rollers and/or belts, may optionally be used to transport a series of envelopes through the system 10. A scanning device 20 is coupled to the control unit to read information from vote by mail ballot envelopes that are processed using the system 10.

Figure 2A:
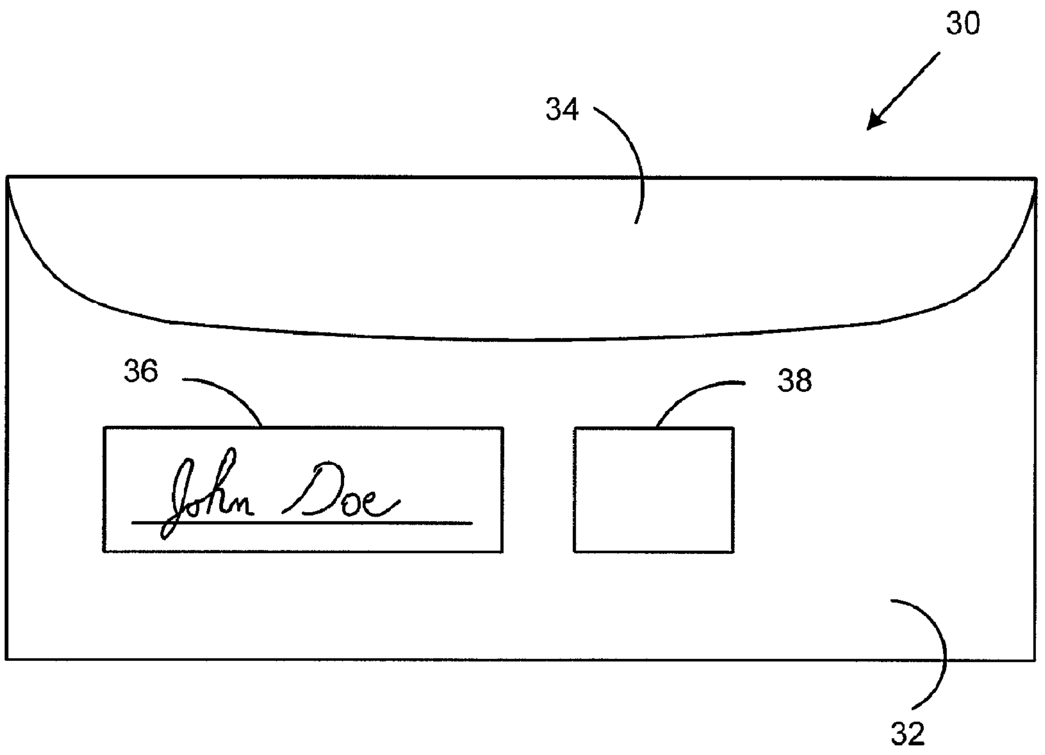
FIGS. 2A and 2B illustrate a vote by mail ballot envelope that may be used in an embodiment of the present invention.

FIG. 2A illustrates an example of a vote by mail ballot envelope 30 that may be used in an embodiment of the present invention. Envelope 30 includes a body portion 32 and a flap portion 34 connected to the body portion 32. When the flap portion 34 is in an open position (not illustrated in FIG. 2A), contents, such as, for example, a ballot, can be inserted into a pocket formed by the body portion 32. The flap portion 34 can then be moved to a closed position (as illustrated in FIG. 2A), and sealed utilizing a glue or sealing strip which when activated will adhere the flap portion 34 to the body portion 32, thereby covering the pocket and preventing the contents therein from falling out.

The body portion 32 is provided with a signature area 36 intended for the voter's signature. An area for voter identification information 38 may also be provided adjacent to the signature area 36. Such information can include, for example, the voter's name and address, and is preferably provided in some machine readable form such as a barcode. Alternatively, the voter identification information could be printed on the flap portion 34 or elsewhere on the body portion 32 such that it can be viewed when the flap portion 34 is in the closed position as illustrated in FIG. 2A.

Figure 2B:
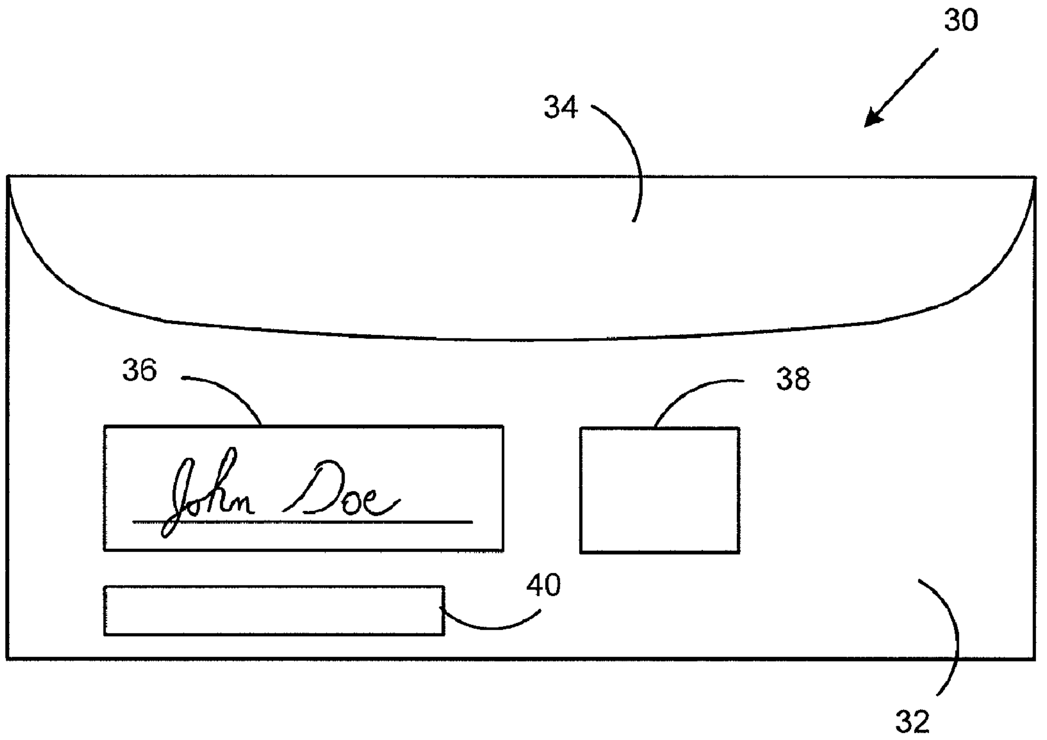

FIG. 2B illustrates the envelope 30 after a ballot (not shown) has been completed and the mail piece has been provided for induction into the mail stream for return to the election officials. As can be seen from FIG. 2B, a marking 40 has been provided on the body portion 32 of the envelope 30. The marking 40 preferably indicates a location and time of induction (entry) of the envelope 30 into a delivery system for return to the election officials. Marking 40 is preferably in the form of a machine readable barcode or the like. The marking 40 can be added to the envelope 30 by a postal service or other carrier service when the mail piece is received for return to the election officials. Alternatively, the marking 40 could be provided on the envelope 30 by a third-party presort house if such is used to process the envelope 30 for return to the election officials. In such a situation, the location of induction can be either the location where the third-party presort house brings its mail for induction with the postal carrier or the location of the third-party presort house, and the time of induction can be the time when the envelope 30 was received (or some time shortly thereafter) by the third-party presort house. It should be noted that while the marking 40 preferably indicates a location and time of induction of the envelope 30 as noted above, the marking 40 could contain other information, instead of or in addition to, the location and time of induction, that can be utilized to detect a discrepancy between what is expected for the return of the envelope 30 (or a plurality of envelopes 30 from different voters) and what has actually occurred as described below.

Figure 3A:
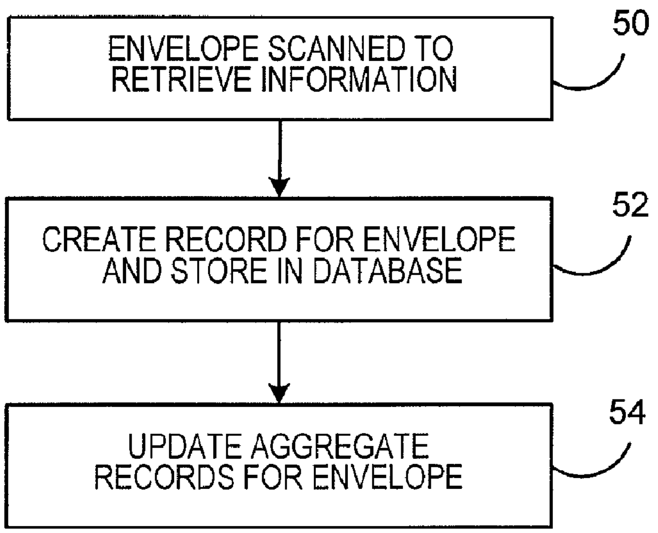
FIGS. 3A, 3B and 3C are flowcharts illustrating the processing performed to detect potential coercion or vote buying according to embodiments of the present invention.

FIG. 3A illustrates in flow chart form the processing performed by the system 10 upon receipt of envelope 30 to detect potential coercion or vote buying according to an embodiment of the present invention. In step 50, the envelope 30 is transported by the transport 18 past the scanning device 20 and information provided on the envelope 30 is obtained by the control unit 12 utilizing the scanning device 20. In systems 10 in which a transport 18 is not provided, scanning device 20 may be a hand-held scanning device and each envelope 30 is manually scanned when received by the election officials. The information obtained from the envelope 30 includes at least the voter identification information 38 and one or more induction parameters of the envelope, e.g., the location and time of induction of the envelope 30, from the marking 40 provided on the envelope 30. Other information may also be obtained, such as, for example, an image of the voter's signature.

In step 52, the control unit 12 will create a record including at least a portion of the voter identification information 38, the location of induction of the envelope 30, and the time of induction of the envelope 30. The portion of the voter identification information 38 included in the record preferably includes at least the voter's name and address. This information can be obtained directly from the voter identification information 38 that is provided on the envelope 30, from voter records maintained in the database 16, or from a combination of the two. Alternatively, the voter identification information 38 included in the record can include a location specified by the voter that is not the voter's normal residence, e.g., vacation residence, work location, or the like. The created record can then be stored in the database 16. Database 16 is also utilized by the control unit 12 to store records that compile data obtained from all of the envelopes 30 processed by the system 10. Such aggregate records could include, for example, data sorted based on the location of induction and the time of induction. In step 54, these records are updated in the database 16 to reflect the envelope 30 that has just been processed.

Figure 3B:
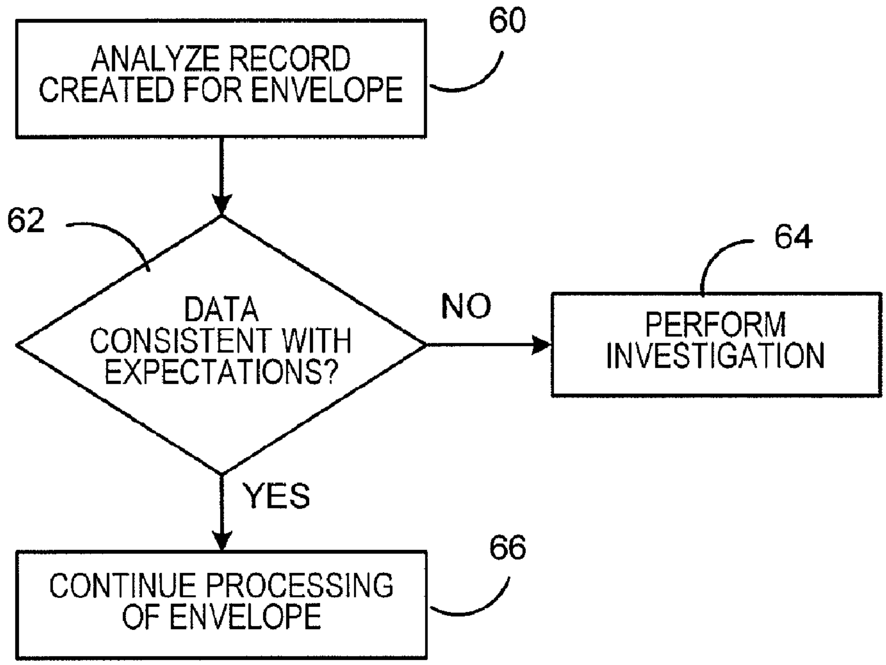

FIG. 3B illustrates an example of processing that may be performed by the system 10 to determine potential coercion or vote buying based on each envelope 30. In step 60, the record created for a specific envelope 30 is analyzed by the control unit 12 to detect if potential coercion or vote buying has occurred with respect to the ballot contained in that specific envelope 30. More specifically, the location of the induction of the envelope 30 into the mail stream is compared with the residence of the voter (or location specified by the voter) associated with that specific envelope 30. Most voters are highly likely to deposit their completed ballots for induction into the mail stream at a location near their residence, or some other area near where they work, vacation, etc. Thus, by comparing the location where the envelope 30 from a particular voter was deposited for induction with the particular voter's residence or the location specified by the voter, it can be determined if there is an inconsistency which may indicate the particular voter did not actually deposit the envelope 30, but instead it was deposited by someone else at a location that is not proximate to the voter's residence. In step 62, it is determined if the data contained in the record is consistent with what is expected, i.e., the envelope 30 was deposited for induction at a location near the voter's residence or at some location as specified by the voter. If the data is not consistent with what is expected, this may be an indication that the voter did not actually deposit the envelope 30, but instead it was provided to another party, which may be due to possible coercion or possible vote buying. Thus, in step 64, the envelope 30 may be flagged or outsorted for investigation by the election officials to determine if coercion or vote buying has actually occurred. If in step 62 it is determined that the data is consistent with what is expected, then in step 66 the envelope 30 can continue to be processed for tabulation of the ballot. Since the processing described in FIG. 3B can be performed essentially in real time upon receipt of each envelope 30, the election officials can perform their investigation quickly and in sufficient time before the end of the election and the ballot is tabulated. If necessary, the election officials can contact the voter, using, for example, an e-mail address supplied by the voter. Optionally, the voter can be notified of receipt of his or her ballot utilizing the e-mail address supplied by the voter.

Figure 3C:
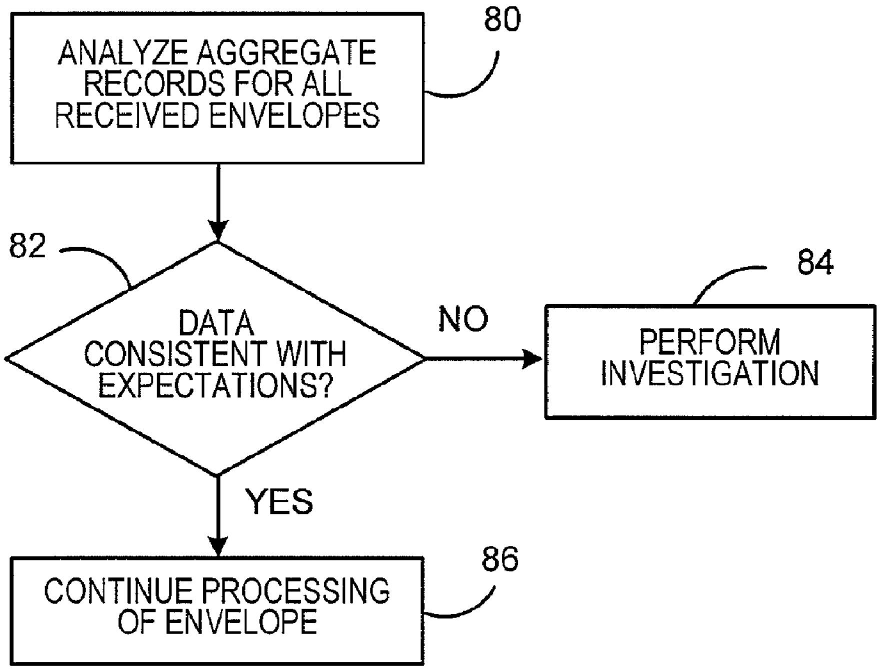

FIG. 3C illustrates an example of processing that may be performed by the system 10 to determine potential coercion or vote buying based on aggregate data for all of the envelopes 30 received. In step 80, the aggregate records maintained in the database 16 are analyzed by the control unit 12 to detect if potential coercion or vote buying has occurred. More specifically, the aggregate records are analyzed to determine if there is an indication of a bulk induction, i.e., a large number of envelopes 30 that were inducted at either the same location and/or the same time. If some group was engaging in either organized coercion or vote buying, the group would most likely deposit all, or large portions of, the envelopes collected from either the coerced voters or the selling voters at the same location and time (a bulk induction). Thus, if there was a large concentration of envelopes 30 that were inducted at the same location (and which location was not near the voters' residences), or if a large number of envelopes 30 were inducted at the same time (regardless of the whether or not the induction location is near the voters' residences), this may be an indication that potential coercion or vote buying has occurred.

In step 82, it is determined if the data contained in the aggregate records is consistent with what is expected, e.g., there is no large concentration of envelopes inducted at the same location and/or substantially at the same time, e.g., within a few hours of each other. Such a large concentration could be indicated, for example, based on exceeding a threshold value. If the data indicates a large concentration of envelopes 30 inducted at the same location and/or time, this may be an indication that the voters did not actually deposit their own envelopes 30, but instead their envelopes 30 were provided to another party for induction, which may be due to possible coercion or possible vote buying. In step 84, the envelopes 30 that caused the inconsistency with what is expected in the data can be retrieved by the election officials for investigation to determine if coercion or vote buying has actually occurred. If in step 82 it is determined that the data is consistent with what is expected, then in step 86 the envelopes 30 can continue to be processed for tabulation of the ballots. Since the processing described in FIG. 3C can be performed essentially in real time before all of the received ballots are tabulated, the election officials can perform their investigation quickly and in sufficient time before the end of the election and the ballot is officially tabulated.

As data is collected over time, the rules that determine if there is an inconsistency or anomaly in the data, e.g., the threshold value, could be altered and refined to better determine only those situations in which coercion or vote buying may have actually occurred. This will prevent election officials from having to conduct investigations that are unnecessary. Additionally, the use of previous elections could provide historical information relative to the voting habits of individual voters. Such information could include, for example, the induction location typically used by a voter, or timing habits relative to voting for a voter (e.g., if a ballot is typically returned early or close to the time of election). Such historical information could be used to establish the expected data for voters when performing the processing described above with respect FIGS. 3B and 3C.

Figure 4:
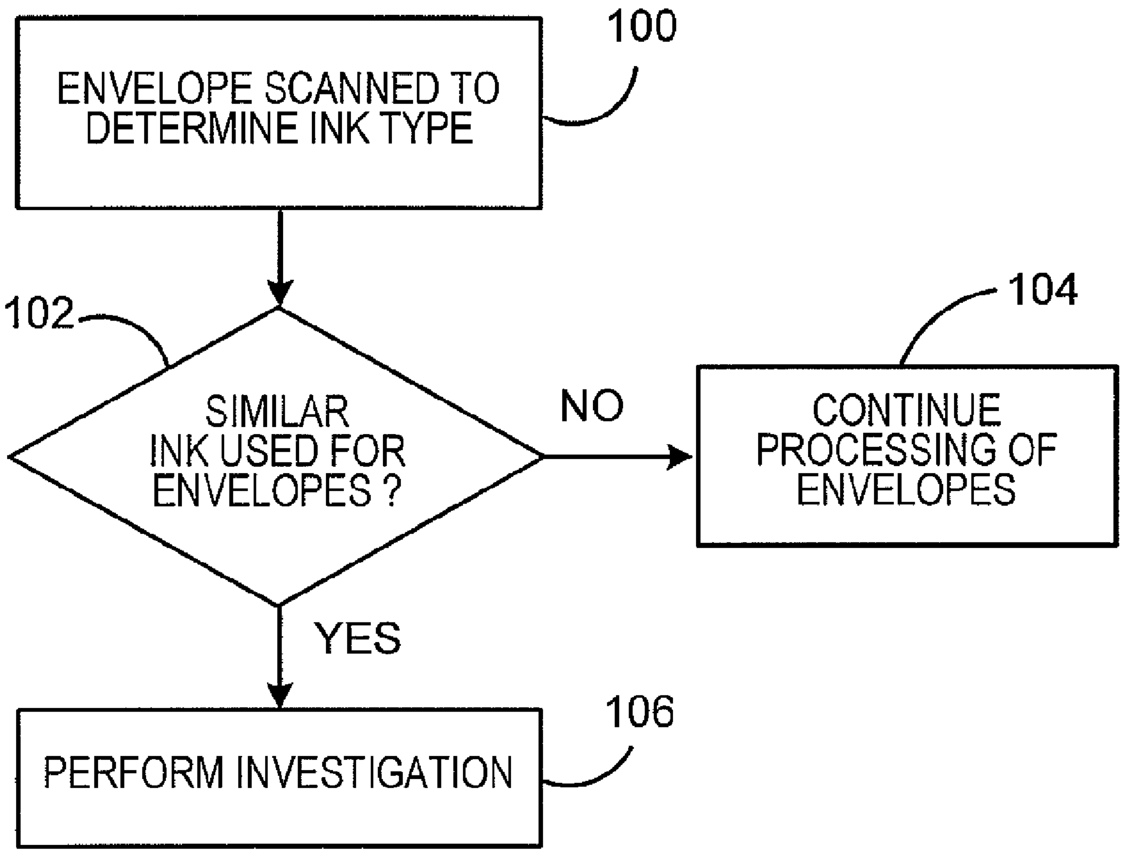
FIG. 4 is a flowchart illustrating the processing performed to detect potential coercion or vote buying according to other embodiments of the present invention.

FIG. 4 illustrates the processing that may be performed to detect potential coercion or vote buying according to other embodiments of the present invention. In this embodiment, a comparison of the ink types used by each voter when completing the ballot and return envelope 30 is performed to determine if a similar ink was used to complete a plurality of ballots. Such a situation could result when the ballots and envelopes 30 are completed at the same time and same location, which may be an indication of coercion by an organized group. In step 100, the envelope 30 is transported by the transport 18 past the scanning device 20 (or other suitable device for determining ink type) and the type of ink used to complete the envelope 30 is determined. The ink type data can be compiled in the database 16. In step 102, it is determined if a similar ink was used to complete some number of envelopes 30 above a predetermined threshold that could be indicative of potential coercion. If in step 102 it is determined that the predetermined threshold is not exceeded, then in step 104 the envelopes 30 can continue to be processed for tabulation. If in step 102 it is determined that a similar ink has been used to complete a number of envelopes 30 above the threshold, this may be an indication of possible coercion or possible vote buying. In step 106, the envelopes 30 that used a similar ink can be retrieved by the election officials for investigation to determine if coercion or vote buying has actually occurred. Since the processing described in FIG. 4 can be performed essentially in real time before all of the received ballots are tabulated, the election officials can perform their investigation quickly and in sufficient time before the end of the election and the ballot is officially tabulated.

Thus, the present invention discourages vote buying and protects legitimate voters from coercers by providing election officials with the resources to determine if potential coercion or vote buying has occurred. In such situations, the election officials can contact the voters before the votes are tabulated, thereby allowing the voters to confirm their votes or change their votes. Therefore, coercers or vote buyers would not be certain that their coerced or purchased vote was ever actually tabulated as intended.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for detecting potential coercion or vote buying in a vote by mail system comprising:

scanning received vote by mail envelopes to obtain at least one induction parameter associated with induction of each envelope into a delivery system for return to election officials for each envelope;

determining if the obtained at least one induction parameter is consistent with an expected induction parameter;

processing each envelope to tabulate votes contained therein if the obtained at least one induction parameter is consistent with the expected induction parameter; and flagging those envelopes for investigation of potential coercion or vote buying where the obtained at least one induction parameter is not consistent with the expected induction parameter.

2. The method of claim 1, wherein the at least one induction parameter is provided on each envelope as a machine readable barcode.

3. The method of claim 1, wherein the at least one induction parameter includes a time of induction of the envelope into the delivery system for return to the election officials.

4. The method of claim 3, wherein determining if the obtained at least one induction parameter is consistent with the expected induction parameter further comprises:

determining if a number of envelopes inducted at substantially the same time exceeds a predetermined threshold;

wherein if the predetermined threshold is exceeded, the obtained at least one induction parameter is not consistent with the expected induction parameter for the number of envelopes.

5. The method according to claim 3, further comprising:

compiling time of induction data obtained from a plurality of the vote by mail envelopes into a single record; and storing the record in a database.

6. The method of claim 1, wherein the at least one induction parameter includes a location of induction of the envelope into the delivery system for return to the election officials.

7. The method of claim 6, wherein determining if the obtained at least one induction parameter is consistent with the expected induction parameter further comprises:

comparing the location of induction of the envelope with a location associated with a voter whose ballot is included in the vote by mail envelope;

wherein if the location of induction of the envelope is not consistent with the location associated with the voter, the obtained at least one induction parameter is not consistent with the expected induction parameter.

8. The method of claim 7, wherein the location associated with the voter is a residence of the voter.

9. The method of claim 8, further comprising:

scanning each envelope to obtain an identification of the voter; and obtaining the residence of the voter from a database based on the identification of the voter obtained from the envelope.

10. The method of claim 8, wherein scanning each envelope further comprises:

scanning each envelope to obtain an identification of the voter and a residence of the voter from the envelope.

11. The method of claim 7, wherein the location associated with the voter is a location provided by the voter.

12. The method of claim 11, further comprising:

scanning each envelope to obtain an identification of the voter; and obtaining the location associated with the voter from a database based on the identification of the voter obtained from the envelope.

* * * * *